United States Patent
Miranda et al.

(10) Patent No.: US 8,190,150 B1
(45) Date of Patent: May 29, 2012

(54) SYNCHRONIZATION OF MOBILE DEVICE INFORMATION IN A WIRELESS COMMUNICATION NETWORK

(75) Inventors: Trevor Miranda, San Jose, CA (US); Nicholas S. Dade, Santa Cruz, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/967,821

(22) Filed: Dec. 14, 2010

(51) Int. Cl.
*H04W 4/00* (2009.01)
*H04W 36/00* (2009.01)

(52) U.S. Cl. .................. 455/432.1; 455/404.2; 455/436; 455/442

(58) Field of Classification Search ............... 455/432.1, 455/41.1, 433, 456.1, 424, 436, 404.2, 442, 455/552.1; 370/333, 338, 331, 328, 332
See application file for complete search history.

(56) References Cited

U.S. PATENT DOCUMENTS

| | | | |
|---|---|---|---|
| 2004/0043767 A1* | 3/2004 | Tsutsumi et al. | 455/432.1 |
| 2007/0291705 A1* | 12/2007 | Iyer et al. | 370/338 |
| 2011/0162060 A1* | 6/2011 | Vijayakumar et al. | 726/13 |

OTHER PUBLICATIONS

Aruba Networks—"Optimizing Aruba WLANs for Roaming Devices"—Version 3.3, Solution Guide—Jul. 2009, 90 pages.
Cisco Systems, Inc.—Bruce McMurdo Introduction to "Cisco Fast Secure Roaming" Copyright 1992-2004—33 pages.

* cited by examiner

*Primary Examiner* — Kiet Doan

(57) ABSTRACT

A technique for synchronization of mobile device information in a wireless communication network includes associating 300 a mobile device (MD) to a first access point (AP). A next step includes transmitting 302 a roam notification message from the first AP to all APs in network. A next step includes associating 304 the MD to a second AP. A next step includes establishing 306 that the first and second APs are roaming neighbors. A next step includes building 308 a roaming neighbor list in the associated first and second APs for the MD, wherein the list includes those neighboring APs where the MD has been associated. A next step includes determining 310 that the MD is currently associated with an AP. A next step includes preemptively pushing 312 information about the MD to those APs in the list of the determined AP for synchronization.

8 Claims, 3 Drawing Sheets

US 8,190,150 B1

SYNCHRONIZATION OF MOBILE DEVICE INFORMATION IN A WIRELESS COMMUNICATION NETWORK

FIELD OF THE DISCLOSURE

The present invention relates generally to wireless communication networks, and more particularly to the synchronization of mobile device information in a wireless communication network.

BACKGROUND

Wireless networks can require the synchronization of mobile device information across the network, e.g. credential cache, authentication information, and firewall flows. For example, as a mobile device roams across a network, the mobile device information needs to be synchronized across all wireless access points in the network. Often this information is required to be present on an access point even prior to association with the mobile device, such as in the case of the sharing of opportunistic key caching information for fast roaming.

Stand-alone access points do not generally synchronize mobile device information. However, those networks that do require synchronization, require every access point to have complete information about every mobile device in the network. In this case, a problem arises for large deployments, where it is not feasible to simply store all information for every mobile device on all access points, due to memory and performance constraints.

One solution to this problem is to implement an additional wireless controller that stores such mobile device information centrally, where an access point can download the information as needed. However, this requires the added cost of wireless controllers. In addition, this does not solve the problem of roaming between different controllers will not work. Another solution requires the cooperation of the mobile device. However, this means that only mobile devices that support the needed proprietary protocols will be able to benefit.

Accordingly, there is a need for a technique to preemptively distribute mobile device information across access points that are predicted to have a future need for this information.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
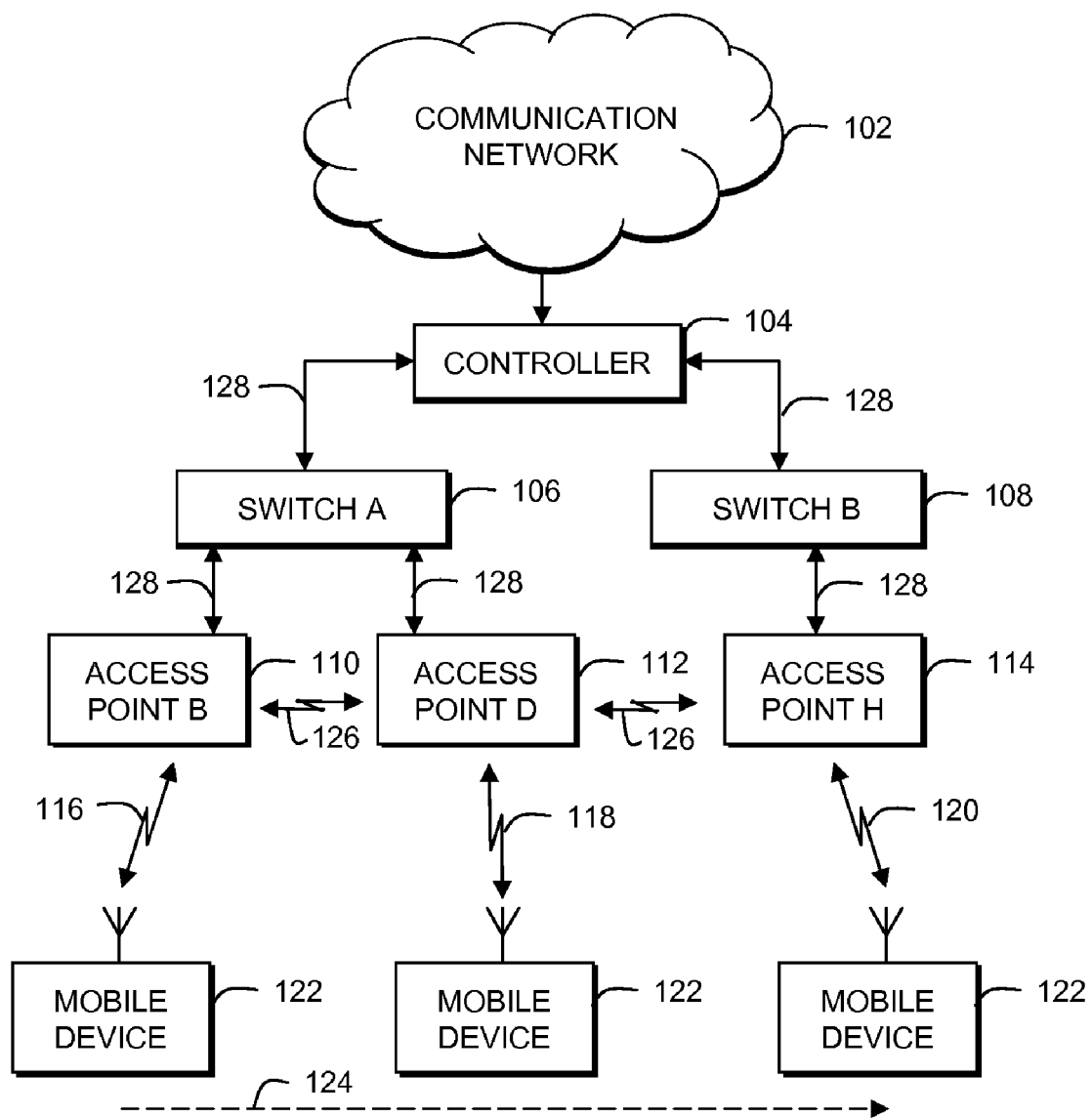
FIG. 1 is a simplified block diagram of a system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described that preemptively distributes mobile device information (e.g. credential cache, authentication information, and firewall flows) across access points that are predicted to have a future need for this information, such as when that mobile device will roam into their service area. The present invention does not require an expensive centralized controller to store state information for all mobile devices. In particular, the present invention provides a technique for access points to synchronize mobile device information only with neighbors where a mobile device might roam. As a result, memory requirements are reduced without adversely affecting network performance, since network traffic is reduced as access points only communicate with their neighbors to synchronize information. In addition, there is a resultant reduction in memory and processor requirements for access points due to smaller amount of data to be synchronized.

FIG. 1 is a block diagram depiction of a system for synchronization of mobile device information in a wireless communication network, in accordance with the present invention. A plurality of network entities are shown, which can provide communications with a wireless mobile device 122. The network entities can include one or more of a router or controller 104, switches 106,108, and wireless access points 110, 112, 114, all connected in wired and/or wireless configurations. In practice, the controller can be connected to an external communication network 102, such as the internet. The controller can be coupled to one or more switches 106, 108, wherein the one or more switches control communications with one or more wireless access points 110, 112, 114 defining a wireless local area network (WLAN), for example. The mobile device 122 can roam 124 within the WLAN, while the one or more switches and access points control communications with the device.

The wireless communication network can include local and wide-area networks, or other IEEE 802.11 wireless communication system. However, it should be recognized that the present invention is also applicable to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

Various entities are adapted to support the inventive concepts of the embodiments of the present invention. Those skilled in the art will recognize that FIG. 1 does not depict all of the equipment necessary for system to operate but only those system components and logical entities particularly relevant to the description of embodiments herein. For example, routers, controllers, switches, access points, and mobile devices can all includes separate communication interfaces, transceivers, memories, etc. all under control of a processor. In general, components such as processors, transceivers, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, a mobile device 122 is able to roam along a route 124 within the wireless communication network. Communications 116, 118, 120 with the mobile device are handed off from one access point to another as the route 124 of the mobile device 122 traverses the service areas of the respective access points 110, 112, 114 along its route 124. Each access point learns where a presently serviced mobile device has roamed from a roam notification message 128. For example, when a mobile device first associates to an access point (e.g. access point B 110), that access point transmits a roam notification message 128 on the infrastructure 104, 106, 108 of the wireless communication network (or directly 126 between access points) which is communicated to all other access points in the network. The roam notification message is an indicator that the mobile device has the potential to roam to any of the access points in the network as is sent even if the mobile device does not actually roam. The roam notification message 128 contains fields identifying the presently serving access point as well as identifying the mobile device being served. If this roam notification message is heard by a second access point (e.g. access point D 112), and this second access point subsequently finds itself associated to the mobile device, that second access point will then know that the mobile device has roamed to it from the first access point (e.g. B 110). The second access point can then communicate with the first access point (either through the network infrastructure or directly) in order to establish that they are "roaming neighbors", i.e. the mobile device identified in the roaming notification message has, in practice, roamed between them.

Every access point builds its own list of the identities of roaming neighbor access points. This list can also include particular mobile device identities, along with those neighboring access points that each mobile device roams to in practice. The list is a subset of all access points present in a network, as mobile devices follow particular roaming patterns through the serving areas of these access points. For each such neighbor in its list, the access point preemptively pushes information for all known mobile devices currently associated to the access point to those neighboring access points in its list in order to synchronize the information between those access points before the mobile device actually roams. The access point can also delete any information for mobile devices not presently associated with it and any of its neighbors. In this way, only a subset of all access point need to synchronize and store information for mobile devices present within it serving area, and a mobile device will be able to quickly roam between those access points in the roaming neighbor list.

Each access point can build a list of the neighboring access points that its associated mobile devices are most likely to roam to. Mobile devices tend to follow a repetitive pattern in roaming. For instance, if a mobile device decides to roam because of low signal strength from an access point, it will likely roam to a closer access point rather than a farther one. The list of likely roaming neighbors is the subset of access points that the associated mobile device information will be preemptively pushed to, either through direct communication between access points of through the network infrastructure, in order to synchronize the mobile device information between those access points before the mobile device roams. For example, even if an access point physically has six nearest neighboring access points, in practice only two of these may be likely roaming targets for a particular identified mobile device, and therefore only these two access points will be synchronized with that mobile devices information. If the mobile device happens to roam to an access point not on the list, then normal handoff procedures apply.

In accordance with one embodiment of the present invention, roaming patterns can be dynamically learned by the controller and can be use used to derive other information about a wireless network (e.g. if there are too many roaming neighbors, perhaps radio power levels need to be reduced). In accordance with another embodiment of the present invention, roaming patterns that can't be found using existing direct radio frequency techniques (i.e. signal strength measurements) can still be discovered even though roaming access points in the list are not physically neighbors, e.g. if there is an elevator between two floors (with no wireless coverage inside the elevator), the access points on each floor closest to the elevators will consider each other roaming neighbors because mobile devices roam between them as people move between floors, even though the access points do not see each others' signals.

Figure 2:
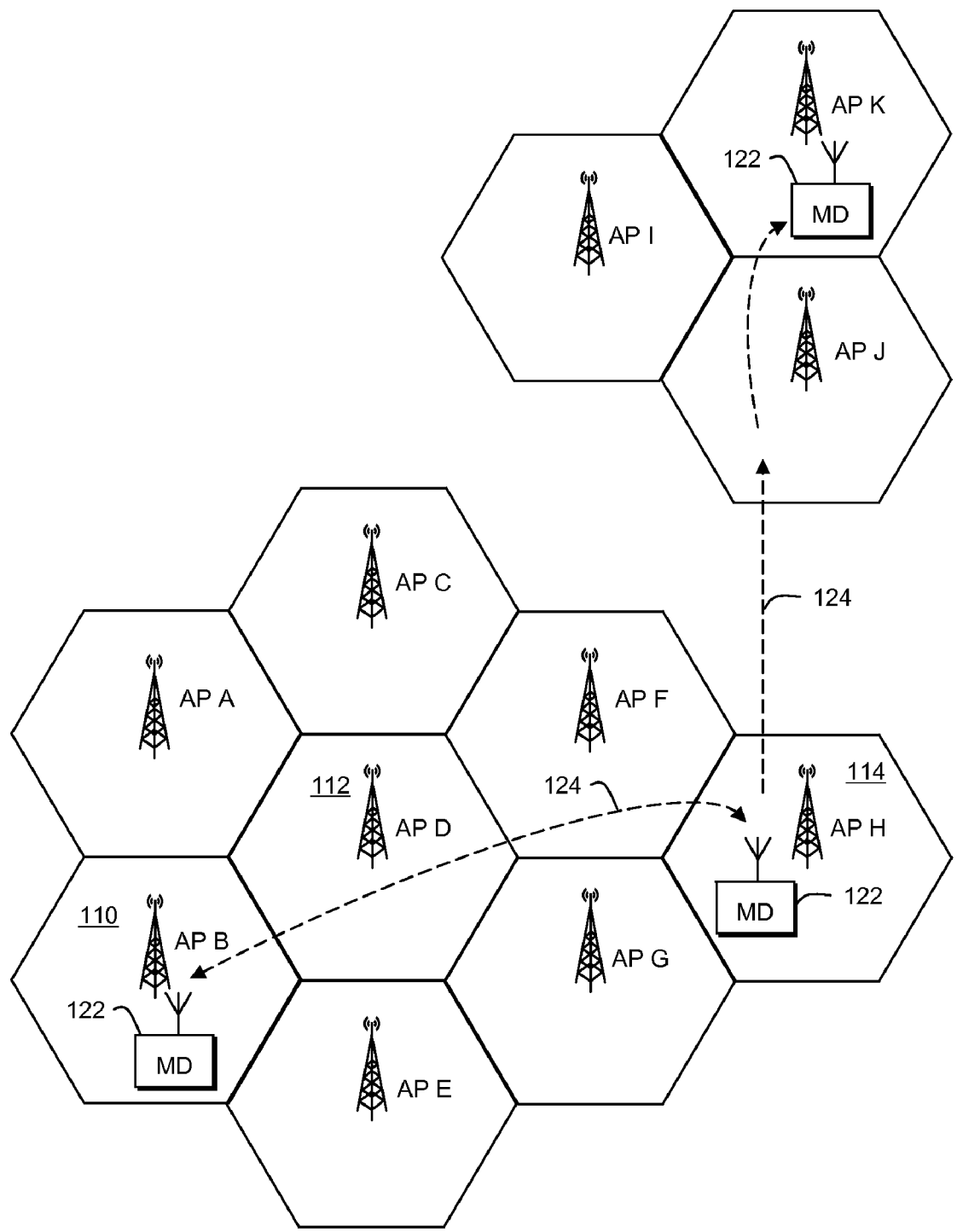
FIG. 2 is an illustration of a network, in accordance with the present invention.

Referring to FIG. 2, a communication network of wireless access points (A through K) is shown, such as can be found within a building. A mobile device 122 can roam within the network along a path or route 124. In the example shown, the mobile device 122 typically roams between a service area of AP B 110 and a service area of AP H 114, i.e. the mobile device traverses the service areas of access points B, D, F, H. Optionally, the mobile device can further roam to a different floor in the building, containing access points I though K for example. For instance, a user could take a mobile device on an elevator from one floor having access point H to another floor having access point J. The mobile device 122 could then roam on the route 124 to other access points (K, I) on this other floor, for a total roaming range of access points B, D, F, H, J, K.

In the example shown, the mobile device 122 first associates to an access point B 110. As part of the association, access point B stores information relating to mobile device 122. Access point B then transmits a roam notification message to all other access points (A through K) in the network. The roam notification message contains fields identifying the serving access point as well as identifying the mobile device being served. Access point D 112 hears this message and stores this information in memory. When it is found that the identified mobile device is subsequently associated to access point D, this access point will then know that the mobile device has roamed to it from access point B 110. Access point D then communicates with the access point B in order to establish that they are "roaming neighbors", whereupon both access points B and D list each other on their respective roaming neighbor list, associated with that mobile device identifier.

These access points B and D then synchronize information for this roaming mobile device that has been associated with each of them. The mobile device then continues on its route, such that access point along the route establishes its roaming neighbor list along with the mobile device identifier. For example, access point D will list access points B and F as its roaming neighbors for mobile device 122. (Other neighbors such as access points A and G may be listed for other mobile devices.) Access point F could list roaming neighbors D and H, access point H could list roaming neighbors F and J, access point J could list roaming neighbors H and K, and access point K could list roaming neighbor J. It should be noted that access points H and J can be roaming neighbors even though they are physically separate from each other, and can not communicate directly.

After the lists are established, the association of mobile device 122 at any access point will cause that access point to preemptively push information about that mobile device to the access points on its list associated with that mobile device in order that the access points can synchronize their information about that mobile device before it actually roams between them.

Figure 3:
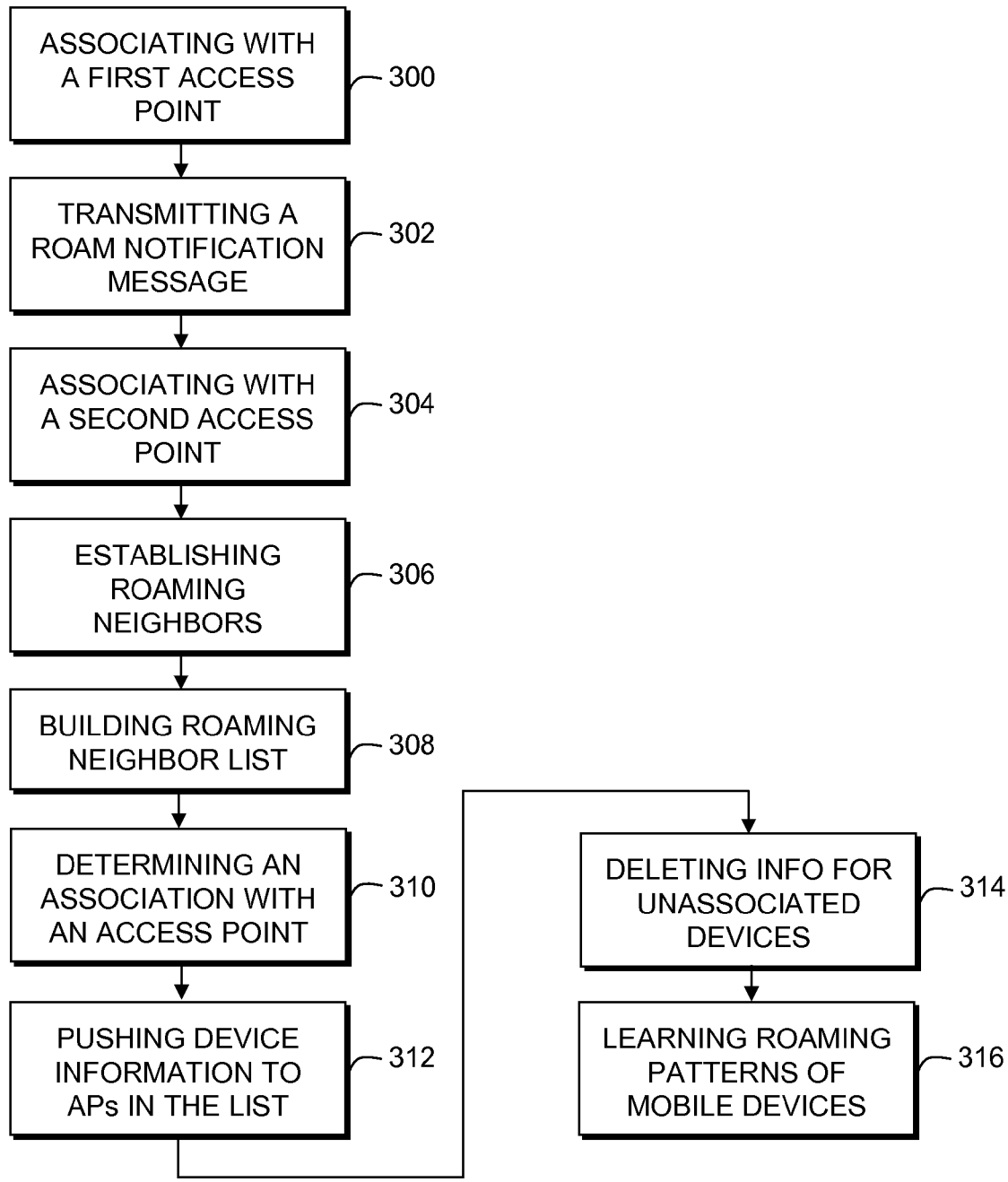
FIG. 3 is a flowchart of a method, in accordance with the present invention.

FIG. 3 illustrates a flowchart of a method for synchronization of mobile device information in a wireless communication network, in accordance with the present invention. The method includes associating 300 a mobile device to a first access point.

A next step includes transmitting 302 a roam notification message from the first access point to all access points in the wireless communication network. The roam notification message includes at least an identifier of the first access point and an identifier of the mobile device A next step includes associating 304 the mobile device to a second access point.

A next step includes establishing 306 that the first and second access points are roaming neighbors. It is possible that these roaming neighboring access points can not be discovered using a direct radio frequency technique.

A next step includes building 308 a roaming neighbor list in the associated first and second access points for the mobile device, wherein the list includes those neighboring access points where the mobile device has been associated.

A next step includes determining 310 that the mobile device is currently associated with an access point.

A next step includes preemptively pushing 312 information about the mobile device to those access points in the roaming neighbor list of the determined access point to synchronize the information about the mobile device.

An optional step of the method includes deleting 314 any information for mobile devices not associated with an access point and access points on its roaming neighbors list.

Another optional step of the method includes dynamically learning 316 roaming patterns of mobile devices to derive network information.

Advantageously, the system and method described herein enables the preemptively distribution of mobile device information across access points that are predicted to have a future need for this information, such as for a roaming handoff. The present invention provides a technique for access points to synchronize mobile device information only with neighbors where a mobile device roams. As a result, memory requirements are reduced without adversely affecting network performance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for synchronization of mobile device information in a wireless local area communication network, the method comprising:
    associating a mobile device to a first access point;
    transmitting a roam notification message from the first access point to all access points in the wireless local area communication network indicating that the mobile device has the potential to roam to any of the access points in the network, wherein the roam notification message to all the access points includes an identity of the first access point and the mobile device;
    associating the mobile device to a second access point;
    establishing that the first and second access points are roaming neighbors by the second access point communicating the mobile device identity to the first access point identified in the roam notification message to confirm that the first and second access points are roaming neighbors;
    building a roaming neighbor list in the associated first and second access points for the mobile device, wherein the list includes the mobile device identity and those neighboring access points where the mobile device has been associated; and
    preemptively pushing authentication information about the mobile device to those access points in the roaming neighbor list of the second access point to synchronize the authentication information about the mobile device before the mobile device actually roams; wherein the roaming neighbor list includes access points that are not physical neighbors and cannot communicate with each other using a direct radio frequency technique.

2. The method of claim 1, wherein the roaming neighbor list is limited to those neighbors to which the mobile device has previously roamed defined from a learned roaming pattern.

3. The method of claim 1, further comprising the step of each access point deleting any information for mobile devices not associated with an any of that access point and access points on its roaming neighbor list.

4. The method of claim 1, further comprising the step of dynamically learning roaming patterns of mobile devices to derive network usage information including the number of roaming neighbors and power levels of the roaming neighbors.

5. An access point for synchronization of mobile device information in a wireless local area communication network, the access point comprising:
    a transceiver; and
    a processor coupled to the transceiver, the processor operable to:
    associate a mobile device to the access point,
    direct the transceiver to transmit a roam notification message from the access point to all access points in the wireless local area communication network indicatin~that the mobile device has the potential to roam to any of the access points in the network, wherein the roam notification message to all the access points includes an identity of the first access point and the mobile device,
    and upon the mobile device roaming to a second access point;
    establishing that the mobile device has associated with the second access point such that the access points are roaming neighbors by the second access point communicating the mobile device identity to the first access point identified in the roam notification message to confirm that the first and second access points are roaming neighbors,
    build a roaming neighbor list for the mobile device in the associated first and second access points, wherein the list includes the mobile device identity and those neighboring access points where the mobile device has been associated, and
    direct the transceiver to preemptively push authentication information about the mobile device to those access points in the roaming neighbor list of the second access point to synchronize the authentication information about the mobile device before the mobile device actually roams; wherein the roaming neighbor list includes access points that are not physical neighbors and cannot communicate with each other using a direct radio frequency technique.

6. The access point of claim 5, wherein the roaming neighbor list is limited to those neighbors to which the mobile device has previously roamed defined from a learned roaming pattern.

7. The access point of claim 5, wherein the processor is further operable to deleting any information for mobile devices not associated with any of that access point and access points on its roaming neighbor list.

8. The access point of claim 5, further comprising a controller operable to dynamically learn roaming patterns of mobile devices to derive network usage information including the number of roaming neighbors and power levels of the roaming neighbors.

* * * * *

UNITED STATES PATENT AND TRADEMARK OFFICE
CERTIFICATE OF CORRECTION

PATENT NO. : 8,190,150 B1
APPLICATION NO. : 12/967821
DATED : May 29, 2012
INVENTOR(S) : Miranda et al.

Page 1 of 1

It is certified that error appears in the above-identified patent and that said Letters Patent is hereby corrected as shown below:

In Column 8, Line 1, in Claim 3, delete "an".

In Column 8, Line 20, in Claim 5, delete "indicatin~that" and insert -- indicating that --, therefor.

Signed and Sealed this
Fifteenth Day of January, 2013

David J. Kappos
*Director of the United States Patent and Trademark Office*